(12) United States Patent
Begue et al.

(10) Patent No.: US 11,596,918 B2
(45) Date of Patent: Mar. 7, 2023

(54) VENT GAS PURGE OPTIMIZER FOR SLURRY LOOP POLYETHYLENE REACTORS

(71) Applicant: ExxonMobil Chemical Patents Inc., Baytown, TX (US)

(72) Inventors: John L. Begue, Port Allen, LA (US); Kelly M. Forcht, Louisville, KY (US); Keith W. Trapp, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 292 days.

(21) Appl. No.: 16/998,237

(22) Filed: Aug. 20, 2020

(65) Prior Publication Data

US 2021/0077970 A1    Mar. 18, 2021

Related U.S. Application Data

(60) Provisional application No. 62/899,826, filed on Sep. 13, 2019.

(51) Int. Cl.
*B01J 19/00* (2006.01)
*C08F 2/01* (2006.01)
*C08F 6/12* (2006.01)

(52) U.S. Cl.
CPC ....... *B01J 19/0006* (2013.01); *B01J 19/0053* (2013.01); *C08F 2/01* (2013.01); *C08F 6/12* (2013.01); *B01J 2219/0022* (2013.01); *B01J 2219/0024* (2013.01); *B01J 2219/00065* (2013.01); *B01J 2219/00069* (2013.01); *B01J 2219/00162* (2013.01);
(Continued)

(58) Field of Classification Search
CPC ................ B01J 19/0006; B01J 19/0053; B01J 2219/00065; B01J 2219/00069; B01J 2219/00162; B01J 2219/00164; B01J 2219/00207; B01J 2219/00213; B01J 2219/0022; B01J 2219/0024; C08F 2/01; C08F 6/12
See application file for complete search history.

(56) References Cited

U.S. PATENT DOCUMENTS 3,152,872 A    10/1964    Scoggin et al.
4,424,341 A    1/1984     Hanson et al.
(Continued)

FOREIGN PATENT DOCUMENTS

WO           03070365        8/2003
WO PCT/US2020/014806       1/2020

OTHER PUBLICATIONS

Allemeersch, P., (Dec. 2015), "Introduction to the Slurry Loop Process", Polymerisation of Ethylene: In Slurry Loop Reactors (Dec. 31, 2015),pp. 1-18.

*Primary Examiner* — Lessanework Seifu
(74) *Attorney, Agent, or Firm* — ExxonMobil Chemical Patents Inc.-Law Department

(57) ABSTRACT

A method for minimizing the amount of catalyst inactivating agent that is present in a liquid fraction recovered from a slurry-based polymer production process, the liquid fraction comprising diluent used in the polymer production process, is disclosed. The method includes steps for controlling the pressure over the liquid fraction collected during diluent recovery so as to minimize the concentration of catalyst inactivating agent that is retained in the recovered liquid fraction. Embodiments of apparatus suitable for conducting the disclosed method are also provided.

12 Claims, 7 Drawing Sheets

(52) U.S. Cl.
CPC ............... *B01J 2219/00164* (2013.01); *B01J 2219/00207* (2013.01); *B01J 2219/00213* (2013.01)

(56) References Cited

U.S. PATENT DOCUMENTS

| | | |
|---|---|---|
| 6,185,349 B1 | 2/2001 | Dammert et al. |
| 6,204,344 B1 | 3/2001 | Kendrick et al. |
| 6,262,191 B1 | 7/2001 | Hottovy et al. |
| 6,818,186 B2 | 11/2004 | Burns et al. |
| 7,645,841 B2 | 1/2010 | Shaw et al. |
| 10,047,176 B2 | 8/2018 | Meier et al. |
| 2003/0027945 A1 | 2/2003 | Kufeld et al. |
| 2010/0317812 A1 | 12/2010 | Towles |
| 2019/0248991 A1 | 8/2019 | Suchao-In et al. |

VENT GAS PURGE OPTIMIZER FOR SLURRY LOOP POLYETHYLENE REACTORS

CROSS-REFERENCE TO RELATED APPLICATION

This application claims the benefit of U.S. Provisional Application 62/899,826 filed Sep. 13, 2019, entitled "VENT GAS PURGE OPTIMIZER FOR SLURRY LOOP POLYETHYLENE REACTORS", the entirety of which is incorporated by reference herein.

BACKGROUND

U.S. Pat. No. 6,204,344 describes a slurry loop polymerization (SLPE) system that includes diluent recovery following separation of polymer product and other heavies from a vapor phase that includes diluent, residual monomer(s) and fines of both product and catalyst in a first flash tank and cyclone. The system disclosed in U.S. Pat. No. 6,204,344 includes a heat exchanger and condenser for liquefying the vapor stream and an accumulator tank in which the liquid is collected. Accumulated condensed diluent is then recycled back to the polymerization reactor.

SUMMARY

In a slurry polymerization process including recovered diluent recycling such as disclosed in U.S. Pat. No. 6,204,344 above, it has been found desirable to terminate the polymerization reaction as an effluent stream carrying the polymer product exits the polymerization reactor. The polymerization reaction can be terminated by adding a catalyst inactivating agent, which can be gaseous under condition of the reactor and other plant components, for example dilute oxygen, to the product effluent stream prior to further processing of the effluent, for instance by separation of the polymer product from the effluent stream.

After separation of the polymer product from the effluent stream, portions of the liquid phase of the reaction slurry can be recovered for recycling into the polymerization reactor, for example the diluent portion. In such a reactor configuration it is desirable to remove the catalyst inactivating agent from the product effluent stream so that no substantial amount of the catalyst inactivating agent is included in liquids recycled to the polymerization reactor.

Presently disclosed are methods and apparatus in which the methods might be practiced for minimizing the amount of a catalyst inactivating agent in a recycled polymerization reaction diluent. One such method can comprise:

i. measuring the gas flow f through the purge line via a flow rate sensor that is operatively connected to send a signal to a flow controller, the purge line being in fluid connection with an accumulator tank that stores a condensate comprising the diluent under an overhead gas comprising a diluent so as to withdraw gas from the accumulator tank;

ii. comparing the measured flow f to a desired gas flow rate set point $f_{sp}$ in a flow controller operatively linked to a temperature control valve disposed in a coolant flow line that provides coolant to a heat exchanger in operative connection to a recycle condenser configured to contact a vapor received from a flash tank and condense at least a portion of the vapor to liquid; and iii. controlling the temperature control valve in a manner that the temperature control valve is opened to lower the temperature of the condenser when f is higher than $f_{sp}$ and the temperature control valve is closed to raise the temperature of the condenser if f is lower than $f_{sp}$, thereby regulating the temperature of the condenser such that a substantially constant vapor pressure p of the overhead gas is maintained in the accumulator tank.

Another such method can comprise:

i. measuring a pressure in a purge line p, the purge line being in fluid connection with an accumulator tank that stores a condensate comprising a diluent under an overhead gas comprising the diluent so as to withdraw gas from the accumulator tank;

ii. comparing in a pressure controller that is operatively connected to receive a signal from the pressure sensor the measured pressure and a desired pressure set point $p_{sp}$ stored in the pressure controller; and iii. controlling a temperature control valve operatively linked to the pressure controller and disposed in a coolant flow line that provides coolant to a heat exchanger in operative connection to a recycle condenser configured to contact a vapor received from a flash tank and condense at least a portion of the vapor to liquid, in a manner that the temperature control valve is opened to lower the temperature of the condenser when p is higher than $p_{sp}$ and the temperature control valve is closed to raise the temperature of the condenser when p is lower than $p_{sp}$, thereby regulating the temperature of the condenser such that a substantially constant vapor pressure p of the overhead gas is maintained in the accumulator tank.

A third embodiment of such a method can be one comprising:

i. measuring the concentration of a gaseous catalyst inactivating agent c in a liquid condensate comprising a diluent and collecting under an overhead vapor comprising diluent and having a vapor pressure p;

ii. comparing the measured concentration c to a pre-set set point $c_{sp}$ for concentration of a dissolved gaseous catalyst inactivating agent in the liquid condensate; and iii. purging a portion of the overhead vapor so as to lower the overhead vapor pressure p if the measured concentration of dissolved gaseous catalyst inactivating agent c is greater than $c_{sp}$.

A fourth embodiment of such a method can be one comprising:

i. measuring the concentration c of a gaseous catalyst inactivating agent dissolved in a liquid condensate comprising a diluent and collecting under an overhead vapor comprising the diluent and having a vapor pressure p;

ii. comparing the measured concentration c to a pre-set set point $c_{sp}$ for concentration of a dissolved gaseous catalyst inactivating agent in the liquid condensate; and iii. controlling a temperature control valve disposed in a coolant flow line that provides coolant to a heat exchanger in operative connection to a recycle condenser configured to contact a vapor received from a flash tank and condense at least a portion of the vapor to liquid, in a manner that the temperature control valve is closed to raise the temperature of the condenser when $c > c_{sp}$ and the temperature control valve is opened to lower the temperature of the condenser, or to not be moved, when $c < c_{sp}$.

Such methods can be conducted in apparatus configured for performing them. In one aspect, such an apparatus can be for regulating the pressure of overhead gas in a vessel accumulating a recycled diluent, comprising:

i) a polymerization reactor system including:
   i-1) a polymerization reactor configured for performing a polymerization reaction in a slurry;
   i-2) a slurry separation system configured for separating polymer product from diluent in the slurry and recovering polymer product separately from diluent;
   i-3) a diluent recycling facility that includes a recycle accumulator configured to collect a condensate liquid comprising the diluent under an overhead vapor comprising the diluent and includes a purge line being in fluid connection with the recycle accumulator so as to withdraw overhead vapor from the recycle accumulator; ii) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator, and configured to receive a signal from a flow controller:
iii) a flow controller that is configured to receive a signal from a flow rate sensor disposed in the purge line, the flow controller being configured to measure in operation the gas flow through the purge line f via the flow rate sensor, to store a pre-set gas flow set point $f_{sp}$ and to compare the gas flow to the stored gas flow rate set point, and configured to send a signal to the temperature control valve in a manner that in operation the temperature control valve is opened when f is higher than $f_{sp}$ and the temperature control valve is closed when f is lower than $f_{sp}$, thereby regulating the temperature of the condenser such that a substantially constant vapor pressure of the overhead gas is maintained in the accumulator tank.

In another aspect, $_{there}$ is disclosed an apparatus for regulating the pressure of overhead gas in a vessel accumulating a recycled diluent, comprising:
i) a polymerization reactor system including:
   i-1) a polymerization reactor configured for performing a polymerization reaction in a slurry;
   i-2) a slurry separation system configured for separating polymer product from diluent in the slurry and recovering polymer product separately from diluent;
   i-3) a diluent recycling facility that includes a recycle accumulator configured to collect a condensate liquid under an overhead gas and includes a purge line being in fluid connection with the recycle accumulator so as to withdraw overhead gas from the recycle accumulator;
ii) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator, and
iii) a sensor of dissolved gas concentration, the gas being oxygen, carbon monoxide or carbon dioxide, or any mixture thereof, disposed in the recycle accumulator and configured in operation to store a set point of dissolved gas concentration in condensed diluent collected in the accumulator, to measure the concentration of dissolved gas in collected condensate, and configured to send a signal to the temperature control valve in a manner that in operation the temperature control valve is closed when the dissolved gas concentration is higher than the set point and the temperature control valve is opened when the dissolved gas concentration is lower than the set point, thereby regulating the temperature of the condenser such that a substantially constant vapor pressure of the overhead gas is maintained in the accumulator tank.

Another aspect of the disclosure is an apparatus for regulating the pressure of overhead gas in a vessel accumulating a recycled diluent. Such apparatus can be one comprising:
i) a polymerization reactor system including:
   i-1) a polymerization reactor configured for performing a polymerization reaction in a slurry;
   i-2) a slurry separation system configured for separating polymer product from diluent in the slurry and recovering polymer product separately from diluent;
   i-3) a diluent recycling facility that includes a recycle accumulator configured to collect a condensate liquid comprising the diluent under an overhead vapor comprising the diluent and includes a purge line being in fluid connection with the recycle accumulator so as to withdraw overhead vapor from the recycle accumulator;
ii) a dissolved gas sensor, the gas being oxygen, carbon monoxide or carbon dioxide, or any mixture thereof, disposed in the recycle accumulator and configured to measure the concentration of dissolved gas in condensate collected in operation;
iii) a pressure control valve disposed in the purge line and configured to receive a signal from a pressure controller;
iv) a pressure controller that is configured to in operation store a set point of dissolved oxygen concentration in the collected condensate $c_{sp}$, to compare the set point to the measured dissolved gas concentration in the collected condensate c, and to signal the pressure control valve to open when c is greater than $c_{sp}$ and to signal the pressure control valve to close when c is less than $c_{sp}$, such that a substantially constant vapor pressure of the overhead gas is maintained in the accumulator tank.

DETAILED DESCRIPTION

Flash gas from a slurry-based polymerization reaction, conducted in, for example a Slurry Loop High Density Polyethylene reactor, is partially condensed in a diluent recovery portion of a 1$^{st}$ stage flash gas system (see, e.g. U.S. Pat. Nos. 6,204,344 and 6,818,186, hereby incorporated by reference in their entirety), and the condensed liquid is recycled back to the reactor for reuse as a diluent. The flash gas stream is typically composed of mostly the diluent agent, typically isobutane, with small concentrations of residual monomer, comonomer(s), and other reactor feeds.

In some instances, to which the present disclosure is applicable, also present in the flash gas stream is a catalyst inactivating agent, intentionally added to the reactor effluent stream to deactivate any residual catalyst. For purposes of the present disclosure, the catalyst inactivating agent should be one that is gaseous at the working temperature and pressure of the condenser, accumulator tank and purge gas line portions of the diluent recovery system. Oxygen diluted with an unreactive gas, preferably nitrogen, is typically used as a catalyst inactivating agent. The oxygen is usually used at a concentration substantially below that in air, e.g. 5-15 vol %, so as to reduce the possibility of fire or explosion. 10 vol % oxygen in nitrogen can be used as a catalyst inactivating agent. Carbon monoxide or carbon dioxide can also be used as the catalyst inactivating agent. Mixtures of oxygen, carbon monoxide and carbon dioxide can also be used as the catalyst inactivating agent, and these can also be diluted in an inert gas (i.e. one that does not inactivate the catalyst or react with the catalyst inactivating agent) such as nitrogen.

In any embodiments disclosed herein, the catalyst inactivating agent can be carbon monoxide, carbon dioxide, or any mixture of any two of oxygen, carbon monoxide and carbon dioxide, or a mixture of all three of them. Typically, the dissolved gas is 10% oxygen in nitrogen. However the dissolved gas can be 5 to 15 vol % oxygen in nitrogen, 5 to 15 vol % oxygen and 5 to 15 vol % carbon monoxide, to provide at least 5 vol % of oxygen-containing molecules, in a balance of nitrogen, or 5 to 15 vol % carbon monoxide in nitrogen.

Figure 1:
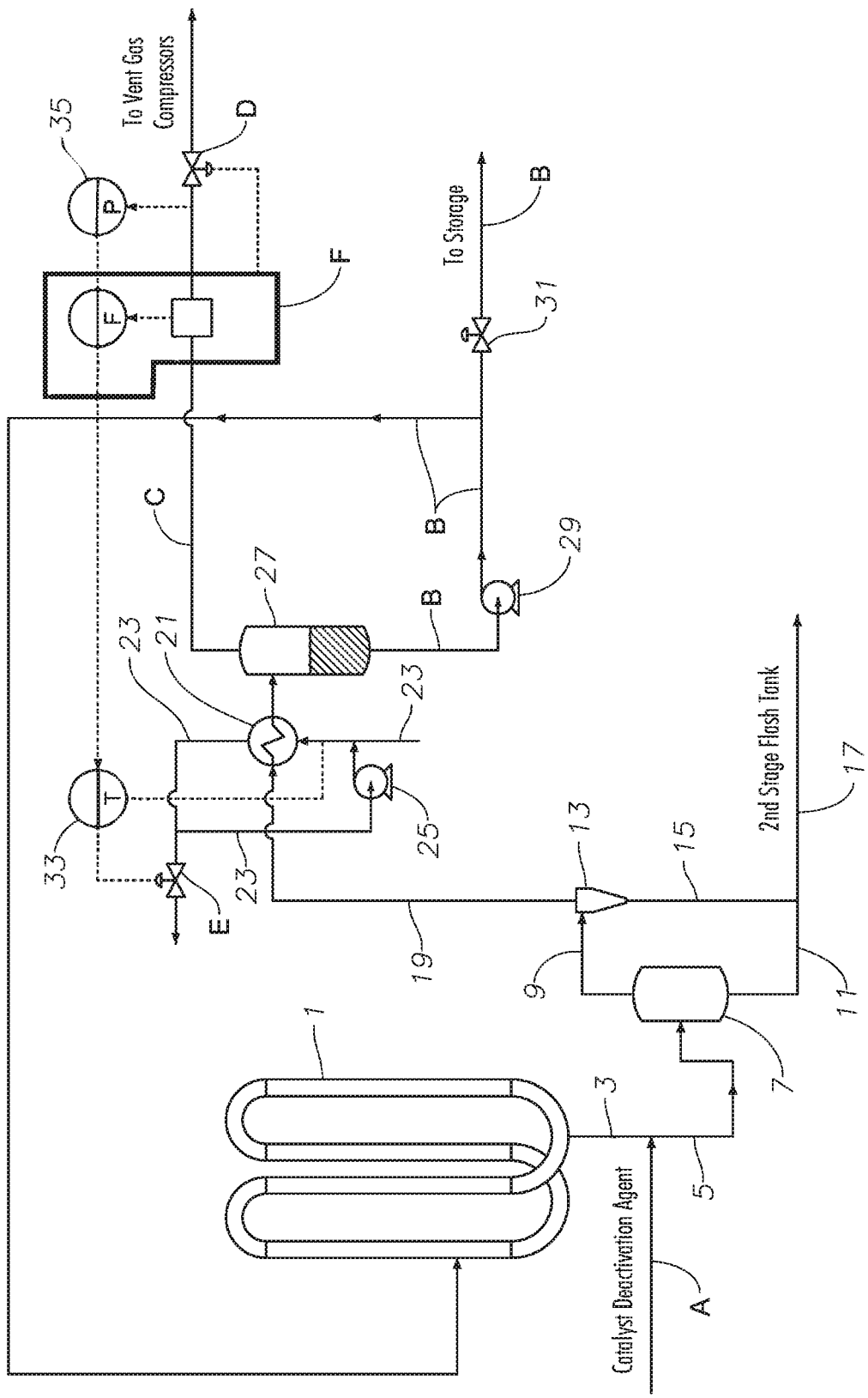
FIG. 1 illustrates a system for implementing the disclosed method.

Referring to FIG. 1, the catalyst inactivating agent (added by the catalyst inactivating agent input stream A in FIG. 1) tends to accumulate in the recycle accumulator vessel 27. This residual catalyst inactivating agent can inhibit the polymerization reaction if sent back to the reactor with recycled diluent.

A gas purge stream C is maintained from the vapor space of the recycle accumulator vessel, drawing away the catalyst inactivating agent and any other light uncondensed gasses. Flow of this gas stream can be regulated by a pressure control valve D, which is designed to maintain consistent conditions in the 1$^{st}$ stage flash tank by holding a back pressure on the system.

When under constant pressure control, the mass flow rate of overhead gas from the recycle accumulator vessel depends on multiple variables, most of which are dependent on reactor rate and other reactor conditions. These reactor conditions continuously vary, causing variable demand on the 1$^{st}$ stage flash gas system and the overhead gas stream from the recycle accumulator vessel.

The overhead gas mass flow rate also depends on the temperature at which the flash gas stream is condensed, which can be controlled independently in response to reactor conditions by regulating the temperature of the condenser, for example by regulating coolant (usually water) flow through the condenser, (e.g. regulating coolant flow rate by temperature control valve E). Higher condenser temperature creates more overhead gas mass flow, and lower temperature results in less overhead gas mass flow.

Vapor and liquid are in equilibrium at vapor-liquid interfaces in the condenser, and also in the accumulator tank that collects liquid from the condenser. This equilibrium can be pushed toward the gas phase by decreasing the pressure in the purge gas line, which also decreases the pressure in the accumulator tank and in the condenser. Conversely, the equilibrium can be pushed toward the liquid phase by increasing the operating pressure in this portion of the system.

As the catalyst inactivating agent is one that is gaseous at the temperature and pressure of the 1$^{st}$ stage flash tank, the condenser, the accumulator tank and the purge line, then the catalyst inactivating agent will partition predominantly into the vapor overhead of the accumulator tank and then be drawn off in the purge gas stream from the accumulator tank.

Excess purge gas flow can reduce the amount of 1$^{st}$ stage diluent available for recycle, and can overload the vent gas compression systems receiving the overhead gas. Insufficient purge gas flow can allow catalyst inactivating agent and other polymerization reaction inhibiting substances to accumulate in the recycle vessel, adversely affecting the polymerization reaction when accumulated condensed liquids are recycled back to the reactor.

On the other hand, insufficient catalyst inactivating agent addition results in continuing polymerization within the reactor product effluent stream, which leads to fouling in the 1$^{st}$ stage flash gas system and especially in the 1$^{st}$ stage flash tank.

Thus, it is desirable to provide a stable flow of the purge gas (C), which in turn allows optimizing the feed rate of the catalyst inactivating agent.

In the present disclosure, an "acceptable variation", "acceptable variance" or the like is a proportion of the measured value of the parameter mentioned, and is typically up to 5% of the measured value.

In the present disclosure. "substantially constant vapor pressure" means a vapor pressure that varies by less than 5%.

In the present disclosure, at least 85% of the catalyst inactivating agent is removed from the diluent collected in the accumulator. Preferably, at least 90%, or at least 95% or at least 97% or at least 99% of the catalyst inactivating agent is removed from the diluent collected in the accumulator (compared to the amount added to stop the polymerization reaction). "Substantially all of a catalyst inactivating agent is removed" from liquid diluent collected in an accumulator if use of such collected diluent to provide 85 volume percent of the diluent in a polymerization reactor does not decrease the yield of the polymer by more than 5% compared to the yield when only previously unused diluent is used in the polymerization reactor.

The object of controlling the gas purge rate is to obtain a pressure over the accumulator at which substantially all of the catalyst inactivating agent is removed from diluent collected in the accumulator. A desired value for the gas purge rate can be derived experimentally by incrementally increasing the gas flow rate until the product production rate levels off—this flow rate can be the "desired flow rate" or "predetermined set point" of the flow rate.

A set point value for the overhead pressure in the accumulator and connected purge gas line can be determined in a similar way. A desired value for the overhead pressure can be derived experimentally by incrementally increasing the overhead pressure until the product production rate levels off—this pressure can be the "desired overhead pressure" or "predetermined set point" of the overhead pressure.

In some instances, for example when it is desired to provide for emergency relief of an overpressure in the system, a set point for the overhead pressure in the accumulator can be set that is different from, usually higher than, a predetermined set point or desired overhead pressure for general operation of the system to minimize the amount of catalyst inactivating agent in liquid diluent collected in the accumulator. Such a different set point will typically be employed in instances when the temperature of the condenser or the concentration of catalyst inactivating agent in the recovered diluent is the main operational variable used to control the pressure in condenser, accumulator and purge line.

Alternatively, in embodiments in which oxygen is used as the catalyst inactivating agent, a dissolved oxygen sensor can be used to directly measure oxygen concentration in the recovered diluent. Then, a desired dissolved oxygen concentration can be determined experimentally by incrementally adjusting one (or both) of the parameters affecting the purge gas flow rate until the product production rate levels off. The dissolved oxygen concentration at this flow rate can be used as the set point dissolved oxygen concentration, $c_{sp}$.

Similarly, if carbon monoxide or carbon dioxide is used as the catalyst inactivating agent, a commercially available sensor can be used to directly measure the concentration of these gases in the recovered diluent and the desired dissolved gas concentration can be determined as explained above.

A predetermined set point of an operational variable is preferably one that provides a vapor pressure p above the collected condensate in the accumulator tank such that substantially all of the catalyst inactivating agent is removed from the accumulated condensate. Thus, the amount of catalyst inactivating agent in the recycled diluent is "minimized". A "minimum" dissolved oxygen concentration in the accumulated condensate is typically ≤25 ppm, preferably ≤5 ppm.

In one implementation, the concentration of gaseous catalyst inactivating agent, such as oxygen, carbon monoxide, carbon dioxide, or a mixture of any two (or all three) of these dissolved in the condensed liquid collected in the accumulator tank is measured and compared to a predetermined set point. Then, if the measured concentration of dissolved gaseous catalyst inactivating agent exceeds the set point, the overhead pressure in the condenser, the accumulator tank and the purge gas line is lowered by opening a pressure control valve disposed in one of these parts of the system, usually in the purge gas line. Additionally or alternatively, if the measured concentration of dissolved gaseous catalyst inactivating agent exceeds the set point the temperature of the condenser, e.g. by either or both of increasing the flow of coolant to the condenser or by lowering the temperature of the coolant (or both), can be adjusted to increase the rate of condensation, thus lowering the overhead vapor pressure.

On the other hand, if the measured concentration of dissolved gaseous catalyst inactivating agent is less than the set point, the overhead pressure in the condenser, the accumulator tank and the purge gas line can be raised by closing the pressure control valve. Additionally or alternatively, if the measured concentration of dissolved gaseous catalyst inactivating agent is below the set point the flow of coolant to the condenser (or the coolant temperature, or both) can be adjusted to decrease the rate of condensation, thus raising the overhead vapor pressure.

In some implementations, the coolant flow (or temperature) is not adjusted when the measured concentration of gaseous catalyst inactivating agent in the collected liquid is less than the set point. In some implementations, additionally or alternatively, the pressure control valve is not adjusted when the measured concentration of gaseous catalyst inactivating agent in the collected liquid is less than the set point.

Typically, when the gaseous catalyst inactivating agent concentration in the collected liquid is the same as the set point (within an acceptable variance) the flow of coolant to the condenser is not changed (and so the temperature of the condenser is not changed) and the pressure control valve is not moved.

More particularly, disclosed herein is an embodiment of a method for minimizing catalyst inactivating agent in a recycled diluent recovered from a slurry-based polymerization process. Such a method can be one including a step of selecting a set point $c_{sp}$ for a concentration c of a gaseous catalyst inactivating agent dissolved in a liquid condensate comprising the diluent and collecting under an overhead vapor comprising diluent and other vaporized components of the polymerization reactor product effluent and having a vapor pressure p. Such a disclosed method further includes a step of measuring the concentration c of a dissolved catalyst inactivating agent dissolved in the liquid condensate, and a step of comparing the measured concentration c to the set point concentration $c_{sp}$. Such a disclosed method further includes a step of lowering the overhead vapor pressure p if the measured concentration of dissolved gaseous catalyst inactivating agent c is greater than $c_{sp}$.

Such an embodiment can be one wherein the lowering of the pressure is controlled by a pressure control valve that is opened when $c > c_{sp}$ and closed when $c < c_{sp}$. Typically, the pressure control valve will not be moved when c is equal to $c_{sp}$, within some acceptable variation.

In some embodiments, the pressure control valve is in turn controlled by signaling from a pressure sensor-controller. In such embodiments, the pressure sensor-controller can be configured to open the pressure control valve when $c > c_{sp}$ and to close the pressure control valve, or to maintain the valve position, when $c < c_{sp}$, and if applicable, to leave the pressure control valve unmoved when c is equal to $c_{sp}$ within some acceptable variation.

Additionally or alternatively, such embodiments can further comprise a step of controlling a coolant flow to a heat exchanger in operative connection to a condenser configured to condense a vapor and condense at least a portion of the vapor to liquid, in a manner that the coolant flow is decreased to raise the temperature of the condenser when $c > c_{sp}$ and controlling the coolant flow in a manner that the coolant flow is increased to lower the temperature of the condenser, or to leave the temperature unchanged, when $c < c_{sp}$. Typically the temperature of the condenser will not be changed when c is equal to $c_{sp}$, within some acceptable variation.

The presently disclosed methods can be embodied as a method for minimizing catalyst inactivating agent in a recycled diluent comprising:

i. measuring the gas flow f through the purge line via a flow rate sensor that is operatively connected to send a signal to a flow controller, the purge line being in fluid connection with an accumulator tank that stores a condensate comprising the diluent under an overhead gas comprising a diluent so as to withdraw gas from the accumulator tank;

ii. comparing the measured flow f to a desired gas flow rate set point $f_{sp}$ set in a flow controller operatively linked to a temperature control valve disposed in a coolant flow line that provides coolant to a heat exchanger in operative connection to a recycle condenser configured to contact a vapor received from a flash tank and condense at least a portion of the vapor to liquid; and iii. controlling the temperature control valve in a manner that the temperature control valve is opened to lower the temperature of the condenser when f is higher than $f_{sp}$ and the temperature control valve is closed to raise the temperature of the condenser if f is lower than $f_{sp}$, thereby regulating the temperature of the condenser such that a substantially constant vapor pressure of the overhead gas is maintained in the accumulator tank.

Further, the temperature control valve can be not moved when f is equal to fsp, within some acceptable variation.

Such an embodiment can further comprise:

iv. measuring the pressure in the purge line p by a pressure sensor disposed in the purge line, and signaling the flow controller the pressure in the purge line;

v. controlling via the flow controller a pressure control valve in a manner that, if the pressure in the purge line exceeds a pre-set value of p, the pressure control valve is opened.

Further, the pressure control valve can be closed if the pressure in the purge line is below the pre-set value of p. Additionally or alternatively, the pressure control valve can be not moved if the pressure in the purge line is equal to the pre-set value of p, within some acceptable variation.

The presently disclosed methods can also be embodied as a method for minimizing catalyst inactivating agent in a recycled diluent comprising:

i. measuring a pressure in a purge line p, the purge line being in fluid connection with an accumulator tank that stores a condensate comprising a diluent under an overhead gas comprising the diluent so as to withdraw gas from the accumulator tank;

ii. comparing in a pressure controller that is operatively connected to receive a signal from the pressure sensor the measured pressure and a desired pressure set point $p_{sp}$ stored in the pressure controller; and iii. controlling a temperature control valve operatively linked to the pressure controller and disposed in a coolant flow line that provides coolant to a heat exchanger in operative connection to a recycle condenser configured to contact a vapor received from a flash tank and condense at least a portion of the vapor to liquid, in a manner that the temperature control valve is opened to lower the temperature of the condenser when p is higher than $p_{sp}$ and the temperature control valve is closed to raise the temperature of the condenser when p is lower than $p_{sp}$, thereby regulating the temperature of the condenser such that a substantially constant vapor pressure of the overhead gas is maintained in the accumulator tank.

Further, the temperature control valve can be closed if the pressure in the purge line is below $p_{sp}$. Additionally or alternatively, the temperature control valve can be not moved if the pressure in the purge line is equal to $p_{sp}$, within some acceptable variation.

Such an embodiment can further comprise:

iv. signaling a pressure controller the pressure in the purge line; and v. controlling via the pressure controller a pressure control valve in a manner that, if p exceeds the value of $p_{sp}$, the pressure control valve is opened.

The presently disclosed methods can further be embodied as a method for minimizing catalyst inactivating agent in a recycled diluent comprising:

i. measuring the concentration of a gaseous catalyst inactivating agent c in a liquid condensate comprising a diluent and collecting under an overhead vapor comprising diluent and having a vapor pressure p;

ii. comparing the measured concentration c to a pre-set set point $c_{sp}$ for concentration of a dissolved gaseous catalyst inactivating agent in the liquid condensate; and iii. purging a portion of the overhead vapor so as to lower the overhead vapor pressure p if the measured concentration of dissolved gaseous catalyst inactivating agent c is greater than $c_{sp}$.

Such an embodiment can be one wherein the purging is controlled by a pressure control valve that is configured to open when $c > c_{sp}$ and to close, or to not be moved, when $c < c_{sp}$. Further, the pressure control valve can be not moved if c equals $c_{sp}$, within some acceptable variation.

Such embodiments can further comprise:

iv. controlling a coolant flow to a heat exchanger in operative connection to a condenser configured to condense a vapor and condense at least a portion of the vapor to liquid, in a manner that the coolant flow is decreased to raise the temperature of the condenser when $c > c_{sp}$ and controlling the coolant flow in a manner that the coolant flow is increased to lower the temperature of the condenser, or in a manner that leaves the condenser temperature unchanged, when $c < c_{sp}$. Further, the coolant flow can be left unchanged if c equals $c_{sp}$, within some acceptable variation.

The presently disclosed methods can further be embodied as a method for minimizing catalyst inactivating agent in a recycled diluent comprising:

i. measuring the concentration c of a gaseous catalyst inactivating agent dissolved in a liquid condensate comprising a diluent and collecting under an overhead vapor comprising the diluent and having a vapor pressure p;

ii. comparing the measured concentration c to a pre-set set point $c_{sp}$ for concentration of a dissolved gaseous catalyst inactivating agent in the liquid condensate; and iii. controlling a temperature control valve disposed in a coolant flow line that provides coolant to a heat exchanger in operative connection to a recycle condenser configured to contact a vapor received from a flash tank and condense at least a portion of the vapor to liquid, in a manner that the temperature control valve is closed to raise the temperature of the condenser when $c > c_{sp}$ and the temperature control valve is opened to lower the temperature of the condenser, or to not move the temperature control valve, when $c < c_{sp}$.

In any of the method aspects presently disclosed, the gaseous catalyst inactivating agent can be oxygen, carbon monoxide, carbon dioxide, or a mixture of any two of or of all three of oxygen, carbon monoxide and carbon dioxide.

Stable purge gas flow, and particularly when achieved as described above, allows for the optimization of the feed rate of the catalyst inactivating agent, which mitigates potential fouling in the 1$^{st}$ Stage Flash Tank.

In any embodiment of a disclosed method, a measurement of dissolved gaseous catalyst inactivating agent concentration, temperature, pressure or flow rate can be taken at a time t in the polymerization process, and repeated at intervals (which may be equally or unequally spaced). In some embodiments, such measurements are done continuously.

Also disclosed are various apparatus for implementing the methods described above.

Such apparatus can in one aspect be one that comprises:
i) a polymerization reactor system including:
  i-1) a polymerization reactor configured for performing a polymerization reaction in a slurry;
  i-2) a slurry separation system configured for separating polymer product from diluent in the slurry and recovering polymer product separately from diluent;
  i-3) a diluent recycling facility that includes a recycle accumulator configured to collect a condensate liquid comprising the diluent under an overhead vapor comprising the diluent and includes a purge line being in fluid connection with the recycle accumulator so as to withdraw overhead vapor from the recycle accumulator;
ii) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator, and configured to receive a signal from a flow controller;
iii) a flow controller that is configured to receive a signal from a flow rate sensor disposed in the purge line, the flow controller being configured to measure in operation the gas flow through the purge line f via the flow rate sensor, to store a pre-set gas flow set point $f_{sp}$ and to compare the gas flow to the stored gas flow rate set point, and configured to send a signal to the temperature control valve in a manner that in operation the temperature control valve is opened when f is higher than $f_{sp}$ and the temperature control valve is closed when f is lower than $f_{sp}$, thereby regulating the temperature of the condenser such that a substantially constant vapor pressure of the overhead gas is maintained in the accumulator tank.

Such an apparatus can be one that further comprises:
iv) a pressure control valve disposed in the purge line; and
v) and a pressure sensor-controller disposed in the purge line;
wherein the pressure sensor-controller is configured to measure the pressure in the purge line p and is configured to store a set point value $p_{sp}$ of vapor pressure in the purge line and, if in operation p exceeds $p_{sp}$ to send a signal to the flow controller, and the flow controller is configured so that, if said signal is received from the pressure sensor-controller, the pressure control valve is opened.

In any embodiment of this first apparatus aspect of the disclosure, the flow controller can be configured so that no signal to move (or a signal not to move) the temperature control valve is sent if the purge stream flow rate is equal to the set point (within allowable variance).

Similarly, in any embodiment of this first apparatus aspect, the pressure sensor-controller can be configured so that no signal to move (or a signal not to move) is sent to the pressure control valve if the purge line pressure is equal to the set point (within allowable variance). Further, the pressure sensor-controller can be configured to send a signal to close the pressure control valve if p is less than $p_{sp}$.

Another apparatus aspect of the invention lies in an apparatus for regulating the pressure of overhead gas in a vessel accumulating a recycled diluent, for instance so as to minimize the amount of catalyst inactivating agent in liquid diluent collected in an accumulator for recycling, comprising:
i) a polymerization reactor system including:
  i-1) a polymerization reactor configured for performing a polymerization reaction in a slurry;
  i-2) a slurry separation system configured for separating polymer product from diluent in the slurry and recovering polymer product separately from diluent;
  i-3) a diluent recycling facility that includes a recycle accumulator configured to collect a condensate liquid under an overhead gas and includes a purge line being in fluid connection with the recycle accumulator so as to withdraw overhead gas from the recycle accumulator;
ii) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator, and
iii) a sensor of dissolved gas concentration, the gas being oxygen, carbon monoxide or carbon dioxide, or any mixture thereof, disposed in the recycle accumulator and configured in operation to store a set point of dissolved gas concentration in condensed diluent collected in the accumulator, to measure the concentration of dissolved gas in collected condensate, and configured to send a signal to the temperature control valve in a manner that in operation the temperature control valve is closed when the dissolved gas concentration is higher than the set point and the temperature control valve is opened when the dissolved gas concentration is lower than the set point, thereby regulating the temperature of the condenser such that a substantially constant vapor pressure of the overhead gas is maintained in the accumulator tank.

Such an apparatus can further comprise:
iv) a pressure control valve disposed in the purge line; and
v) and a pressure sensor-controller disposed in the purge line that is configured to signal to the flow controller the pressure in the purge line and is configured to store a desired value p of vapor pressure in the purge line and to send a signal from the pressure sensor-controller in a manner that, if in operation the pressure in the purge line exceeds a pre-set value of p, the pressure control valve is opened.

In any embodiment of this additional apparatus aspect of the disclosure, the dissolved gas sensor can be configured so that no signal to move (or a signal not to move) the temperature control valve is sent if the dissolved gas concentration is equal to the set point (within allowable variance).

Similarly, in any embodiment of this additional apparatus aspect, the pressure sensor-controller can be configured so that no signal to move (or a signal not to move) is sent to the pressure control valve is equal to the set point (within allowable variance). Further, the pressure sensor-controller can be configured to signal the pressure control valve to close if p is less than the pre-set value.

An additional embodiment of an apparatus disclosed herein is one for regulating the pressure of overhead gas in a vessel accumulating a recycled diluent, for instance so as to minimize the amount of catalyst inactivating agent in liquid diluent collected in an accumulator for recycling, comprising:

i) a polymerization reactor system including:
   i-1) a polymerization reactor configured for performing a polymerization reaction in a slurry;
   i-2) a slurry separation system configured for separating polymer product from diluent in the slurry and recovering polymer product separately from diluent;
   i-3) a diluent recycling facility that includes a recycle accumulator configured to collect a condensate liquid comprising the diluent under an overhead vapor comprising the diluent and includes a purge line being in fluid connection with the recycle accumulator so as to withdraw overhead vapor from the recycle accumulator;
ii) a dissolved gas sensor, the gas being oxygen, carbon monoxide or carbon dioxide, or any mixture thereof, disposed in the recycle accumulator and configured to measure the concentration of dissolved gas in condensate collected in operation;
iii) a pressure control valve disposed in the purge line and configured to receive a signal from a pressure controller;
iv) a pressure controller that is configured to in operation store a set point of dissolved oxygen concentration in the collected condensate $c_{sp}$, to compare the set point to the measured dissolved gas concentration in the collected condensate c, and to signal the pressure control valve to open when c is greater than $c_{sp}$ and to signal the pressure control valve to close when c is less than $c_{sp}$, such that a substantially constant vapor pressure of the overhead gas is maintained in the accumulator tank.

In any embodiment of this aspect of the disclosure, the pressure controller can be configured so that no signal to move (or a signal not to move) the pressure control valve is sent if the dissolved gaseous catalyst inactivating agent concentration is equal to the set point (within allowable variance, e.g. 1% to 5%, or 3% to 5%, of the measured amount).

Some embodiments of such an apparatus can additionally comprise:
   v) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator, and configured to receive a signal from a flow controller;
   vi) a flow controller that is configured to receive a signal from a flow rate sensor disposed in the purge line, the flow controller being configured to measure in operation the gas flow through the purge line via the flow rate sensor and to compare the gas flow to a pre-set gas flow rate set point, and configured to send a signal to the temperature control valve in a manner that in operation the temperature control valve is opened when the gas flow rate is higher than the set point and the temperature control valve is closed when the gas flow rate is lower than the set point.

In any embodiment of this aspect of the disclosure, the flow controller can be configured so that no signal to move (or a signal not to move) the temperature control valve is sent if the purge gas flow rate is equal to the set point (within allowable variance).

The particular manner in which overhead vapor pressure in the accumulator is regulated by the presently disclosed method and the particular arrangement(s) of valves and the working of their control programming in implementation of the disclosed method using the apparatus disclosed herein provide an improvement in operation of a polymerization reactor, especially in the operation of a polymerization reactor implementing a slurry-based polymerization. Such improvement of the polymerization process can be at least that the amount of catalyst inactivating agent that is used in the recovery of the polymer product is optimized, permitting use of a maximal amount of the catalyst inactivating agent with the aim of minimizing fouling of the production plant downstream of the reactor product effluent stream. A further improvement in polymerization reactor operation can be achieved in that a minimum amount of catalyst inactivating agent is returned to the polymerization reactor in recycled diluent, thus minimizing the reduction in yield due to the presence of catalyst inactivating agent in the polymerization slurry.

Polymerization Reactor Systems

In a polymerization system, generally the polymer product will be separated from the liquid medium comprising an inert diluent and unreacted monomers in such a manner that the liquid medium is not exposed to contamination so that the liquid medium can be recycled to the polymerization zone with minimal if any purification. A particularly favored technique that has been used up to now is that disclosed in the Scoggin et al, U.S. Pat. No. 3,152,872, more particularly the embodiment illustrated in conjunction with FIG. 2 of that patent. (U.S. Pat. No. 3,152,872 is hereby incorporated by reference in its entirety.) In such processes the reaction diluent, dissolved monomers, and catalyst are circulated in a loop reactor in which the pressure of the polymerization reaction is relatively high. The produced solid polymer is also circulated in the reactor. A slurry of polymer and the liquid medium is collected in one or more settling legs of the slurry loop reactor from which the slurry is periodically discharged to a flash chamber wherein the mixture is flashed to a comparatively low pressure. The flashing results in substantially complete removal of the liquid medium from the polymer, and the vaporized polymerization diluent (e.g., isobutane) is then recompressed in order to condense the recovered diluent to a liquid form suitable for recycling as liquid diluent to the polymerization zone. The cost of compression equipment and the utilities required for its operation often amounts to a significant portion of the expense involved in producing polymer.

U.S. Pat. No. 6,204,344, hereby incorporated by reference in its entirety, describes an embodiment of a polymerization system that includes a two-stage flash system for diluent recovery and recycling and associated methods for diluent recovery and recycling. The '344 patent discloses, inter alia, an apparatus for continuously recovering polymer solids from a polymerization effluent comprising a slurry of said polymer solids in a liquid medium comprising an inert diluent and unreacted monomers. The apparatus comprises a discharge valve on a slurry reactor, examples of which include slurry loop reactors and stirred tank slurry reactors, for the continuous discharge of a portion of the slurry reactor contents into a first flash tank. The first flash tank operates at a pressure and slurry temperature such that a substantial portion of the liquid medium will be vaporized and the inert diluent component of said vapor is condensable, without compression, by heat exchange with a fluid. The first flash tank is in fluid communication with a second flash tank via a pressure seal that allows plug flow of a concentrated slurry into a second flash tank that operates at a temperature of the concentrated polymer solids/slurry and pressure such that any remaining inert diluent and/or unreacted monomer will be vaporized and removed overhead for condensation by compression and heat exchange and the polymer solids are discharged from the bottom of said second flash tank for additional processing or storage.

Some polymerization processes distill the liquefied diluent prior to recycling to the reactor. The purpose of distillation is removal of monomers and light-end contaminants. The distilled liquid diluent is then passed through a treater bed to remove catalyst inactivating agents and then on to the reactor. The equipment and utilities costs for diluent distillation and treatment can be a significant portion of the cost of producing the polymer.

In a commercial scale operation, it is desirable to liquefy the diluent vapors at minimum cost. One such technique used heretofore is disclosed in Hanson and Sherk's U.S. Pat. No. 4,424,341, hereby incorporated by reference in its entirety, in which an intermediate pressure flash step removes a significant portion of the diluent at such a temperature and at such a pressure that this flashed portion of diluent may be liquified by heat exchange instead of by a more costly compression procedure.

U.S. Pat. No. 6,818,186, hereby incorporated by reference in its entirety, also describes a polymerization system to which the present disclosure could usefully be applied after modification.

Neither of U.S. Pat. No. 6,204,344 nor 6,818,186 disclose any apparatus including any inlet for a catalyst inactivating agent in their apparatus nor any specifically disclosed manner for adding one. Also, neither of these patents includes any disclosure of monitoring of dissolved oxygen concentration in the condensate held in the $1^{st}$ stage flash system accumulator. Accordingly, an apparatus according to the present disclosure can be arranged by including an inlet for a catalyst inactivating agent in an apparatus as in U.S. Pat. No. 6,204,344 or 6,818,186. In some embodiments, a further modification of including a dissolved gas sensor, or example a dissolved oxygen sensor, or a dissolved carbon monoxide sensor or a dissolved carbon dioxide sensor (or any two or three of these) and a controller suitable for controlling a pressure control valve and/or a flow control valve (which controller might be integral with the sensor) can provide an embodiment of the apparatus as disclosed herein.

A complete polymer production plant will include a number of components for handling solids, liquids and gases, such as but not limited to separator systems such as cyclones and accumulator drums; pumps; sensors or meters of flow, pressure, and/or temperature; and the like, that are not described in detail herein. Unless otherwise described herein, such components are considered to be known in the art.

Valves and Controllers

Valves and controllers that are useful in the presently disclosed methods and apparatus can be any that are known in the art that can be configured in the manner presently described, and are considered to be commercially available. Any one valve can be controlled by a "specific" controller that controls only that valve. Alternatively, a plurality of valves can be controlled by a single controller.

"Sensors" and "controllers" can in all instances be separated one from another and communicate with one another, or can be integrated into a single unit (sometimes referred to herein as a "sensor-controller").

Communication between valves and controllers, or between any two or more controllers, or among various sensors (e.g. a dissolved oxygen sensor) and meters and controllers disposed in or about an apparatus as disclosed herein can be via a wireless network or via a wired network. Design and implementation of a communication network among sensors, meters, controllers and valves is considered to be known in the art.

Control can be "direct", i.e. an instruction that has no condition precedent for its execution, or "hierarchical", i.e. including a set of preconditions that must be met before an instruction is executed. For example, a first controller can "override" a second controller to control a valve if certain preset values of a parameter read by or pre-set in the first controller are exceeded. For instance, a high pressure override might open the pressure control valve, despite other controlling inputs, if operating pressure in the system exceeds some emergency high set point under a reactor upset condition.

Valves are controlled to open and close. Typically movements of valves are incremental, i.e. the valve is controlled to move only a small amount by any one signal from a controller. Moving valves incrementally promotes stability in the operation of the polymerization system, for example by avoiding sudden large pressure changes. It is contemplated, however, that large movements of one or more valves might be used under some reactor conditions or a particular reactor operation (e.g. startup or shutdown). In general, a valve will be moved, and the system will respond in some manner and time will be permitted to allow the full system response before the next controlled valve movement.

The amount that a valve is controlled to move in any one increment, or the frequency of signaling of movement increments, is not necessarily the same for every valve, or for opening and closing movements of a valve. These also may be variable for opening and closing movements of a valve depending upon the operating condition of the reactor.

Certain embodiments of the disclosure are explained in reference to the drawings below.

The drawings are to be considered merely illustrative, the full scope of the invention disclosed being defined by the appended claims.

FIG. 1 presents a schematic of a system for implementing a method of the present disclosure. In FIG. 1, a polymer product stream 3, generally as a slurry comprising principally solid polymer product and catalyst, and a liquid phase of unreacted monomer, unreacted comonomer(s) if present, and a diluent, is removed from a polymerization reactor 1. A stream of a catalyst inactivating agent A is combined with the polymer product stream, preferably at an inlet disposed in a transfer line conducting the polymer product stream, to form an inactivated product stream 5. The inactivated product stream is introduced into a $1^{st}$ stage flash tank 7, that operates at a temperature and pressure such that most, preferably almost all, of the diluent component of the inactivated product stream is vaporized, forming a top vapor stream 9 that comprises diluent and the catalyst inactivating agent, and also typically some unreacted monomer and other light components, and catalyst fines carried along. The top vapor stream is separated from a bottom stream 11, comprising the polymer product and inactivated catalyst in a significantly denser reactor slurry.

The top vapor stream 9 is introduced into a cyclone 13 that separates a streams of solids 15, comprising mostly catalyst fines, from the vapor stream. The solids stream 15 is combined with the flash tank bottom stream 11 and the combined stream 17 is sent to a second stage flash tank and further downstream processing (not shown).

The cyclone also produces a second top vapor stream 19 that is introduced into a condenser 21. The temperature of the condenser is controlled by a flow of coolant 23 circulated by a pump 25, the volume of coolant flow being controlled by a temperature control valve.

The condenser is operatively connected to an accumulator drum 27 that separates the condenser products into a liquid product stream B comprising diluent and a vapor purge stream C comprising the catalyst inactivating agent. The liquid product B is then recycled to the polymerization reactor, providing recycled diluent, or sent to a storage facility, through pump 29 and in proportion according to the setting of the valve 31. (A system for optimizing control of use of recycled diluent is described in PCT Application No. PCT/US20/14806, filed Jan. 23, 2020, and hereby incorporated by reference, can be implemented together with the system disclosed herein.)

The purge stream C flows through a flow meter F and then through a pressure control valve D before going on to a vent gas compression facility (not shown). The purge stream is then piped off-site for further processing, such as chilling and condensing to recover additional diluent and separate it from light components that might also be recycled.

The flow meter F measures the flow rate of the purge gas stream and signals to a temperature sensor-controller 33 operatively linked to a temperature control valve E that controls the flow of coolant through the condenser in response to the signaling of the flow meter F. The flow meter F is configured to also compare the purge gas flow rate to a predetermined/preselected set point and to signal the temperature control valve to open (thus increasing the flow of coolant and lowering the temperature in the condenser) if the purge gas flow rate is higher than the set point and to close (thus decreasing the flow of coolant and raising the temperature in the condenser) if the purge gas flow rate is below the set point. In the event that the purge gas flow rate is equal to the set point (within an allowable variance), the flow meter F will not signal any movement of the temperature control valve, or will signal the temperature control valve not to move, as might apply to the configuration of the system.

The pressure control valve can be operated independently of the temperature control valve, for example, in the event that swings in the overhead pressure in the accumulator tank and downstream from it occur that are not quickly controlled by the change in condenser temperature. A pressure sensor-controller 35 monitors the pressure of the purge gas stream and signals to the flow meter F. Flow meter F in turn controls the position of the pressure control valve D to open if the pressure exceeds a desired setpoint.

Figure 2:
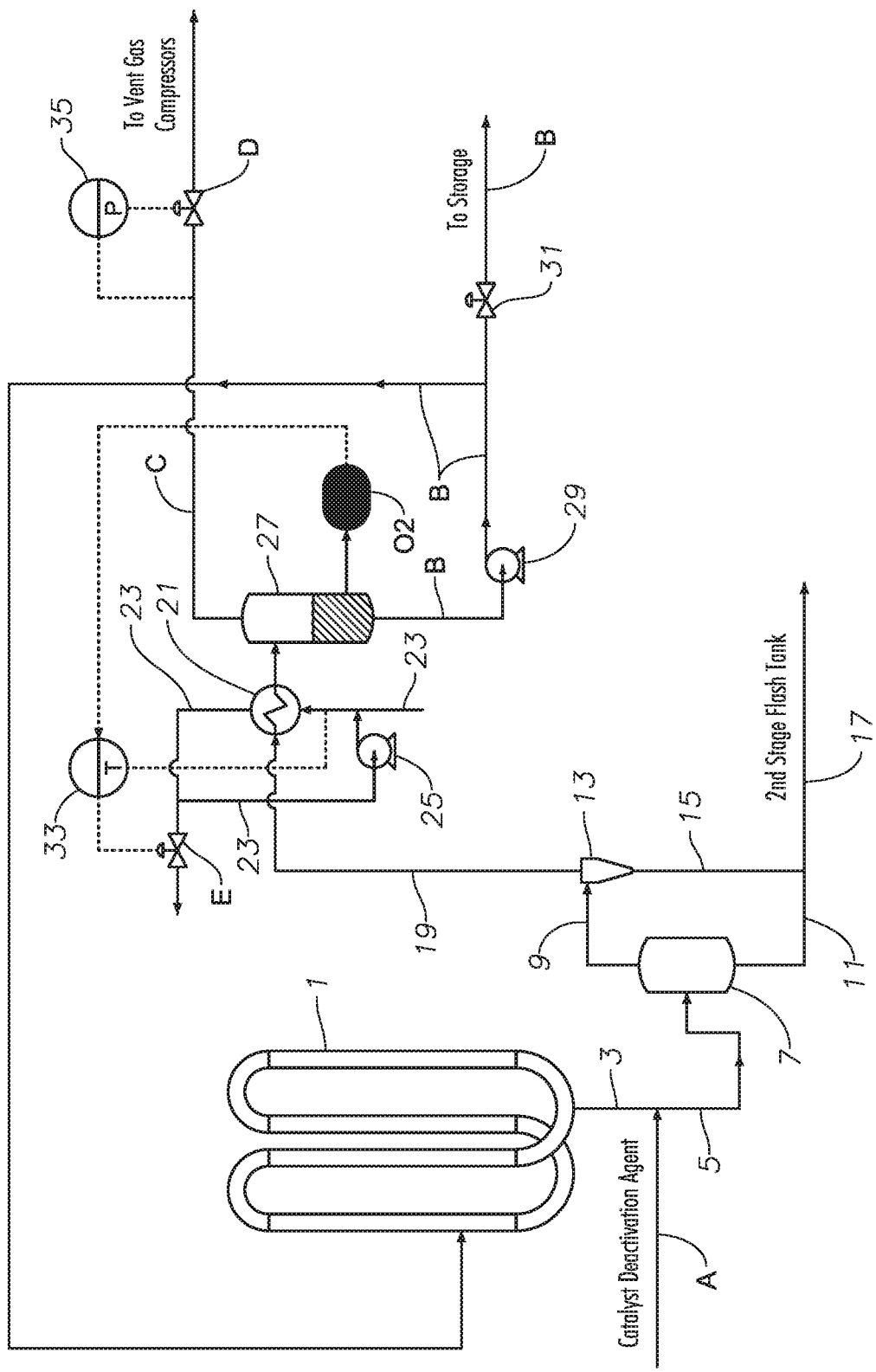
FIG. 2 illustrates another embodiment of a system for implementing the disclosed method.

FIG. 2 illustrates another embodiment of a system according to the present disclosure. In FIG. 2, a polymer product stream 3, as described above, is removed from a polymerization reactor 1. A stream of a catalyst inactivating agent A is combined with the polymer product stream, preferably at an inlet disposed in a transfer line conducting the polymer product stream, to form an inactivated product stream 5. The inactivated product stream is introduced into a $1^{st}$ stage flash tank 7, that operates at a temperature and pressure such that most, preferably almost all, of the diluent component of the inactivated product stream is vaporized, forming a top vapor stream 9 that comprises diluent and the catalyst inactivating agent, and also typically some unreacted monomer and other light components, and catalyst fines carried along. The top vapor stream is separated from a bottom stream 11, comprising the polymer product in a significantly denser reactor slurry.

The top vapor stream 9 is introduced into a cyclone 13 that separates a streams of solids 15, comprising mostly catalyst fines, from the vapor stream. The solids stream 15 is combined with the flash tank bottom stream 11 and the combined stream 17 is sent to a second stage flash tank and further downstream processing (not shown).

The cyclone also produces a second top vapor stream 19 that is introduced into a condenser 21. The temperature of the condenser is controlled by a flow of coolant 23 circulated by a pump 25 and the volume of coolant flow being controlled by a temperature control valve.

The condenser is operatively connected to an accumulator drum 27 that separates the condenser products into a liquid product stream B comprising diluent and a vapor purge stream C comprising the catalyst inactivating agent. The liquid product B is then recycled to the polymerization reactor, providing recycled diluent, or sent to a storage facility, through pump 29 and in proportion according to the setting of the valve 31. (A system for optimizing control of use of recycled diluent is described in PCT Application No. PCT/US20/14806, filed Jan. 23, 2020, and hereby incorporated by reference, can be implemented together with the system disclosed herein.)

The purge stream C flows through a pressure control valve D before going on to a vent gas compression facility (not shown) and then piped off-site for further processing. The pressure control valve operates to maintain the overhead pressure in the accumulator tank. The pressure control valve can also be operated independently from or together with the temperature control valve to maintain an appropriate level of condensate in the accumulator tank.

A dissolved gas sensor O2 disposed in the accumulator tank measures the concentration of dissolved gaseous catalyst inactivating agent in the condensed liquid collected in the accumulator tank and signals to a temperature sensor-controller 33 operatively linked to a temperature control valve E that controls the flow of coolant through the condenser in response to the signaling from the dissolved gas sensor. The dissolved gas sensor is also configured to compare the dissolved oxygen concentration c to a predetermined/preselected set point $c_{sp}$ and to signal the temperature control valve to open (thus increasing the flow of coolant and lowering the temperature in the condenser) if the dissolved oxygen concentration is lower than the set point and to close (thus decreasing the flow of coolant and raising the temperature in the condenser) if the dissolved gas concentration is above the set point. (The comparison function can be performed by a separate unit that stores to value of $c_{sp}$ and compares that value to the measured value c.) In the event that the dissolved gas concentration is equal to the set point (within an allowable variance), the dissolved gas sensor will not signal any movement of the temperature control valve, or will signal the temperature control valve not to move, as might apply to the configuration of the system.

In such embodiments, the dissolved gas can be carbon monoxide, carbon dioxide, or any mixture of any two of oxygen, carbon monoxide and carbon dioxide, or a mixture of all three of them. Typically, the dissolved gas to be measured is oxygen. However the dissolved gas can be carbon monoxide, carbon dioxide, or a mixture of any two, or all three, of oxygen, carbon monoxide and carbon dioxide. Sensors for measuring concentrations of these gases in a liquid are considered known in the art.

A pressure control valve D can be operated independently of the temperature control valve, for example, in the event that swings in the overhead pressure in the accumulator tank and downstream from it occur that are not quickly controlled by the change in condenser temperature. A pressure sensor-controller 35 is configured to store a setpoint of the purge stream pressure p and to measure the pressure of the purge stream and signal to the pressure control valve D to control the pressure control valve to open if the p exceeds the stored setpoint. The stored setpoint can be a value determined to minimize the concentration of catalyst inactivating agent dissolved in liquid diluent collected in the accumulator, or can be some other, higher value, for example a value that provides for pressure relief in an emergency overpressure condition.

Figure 3:
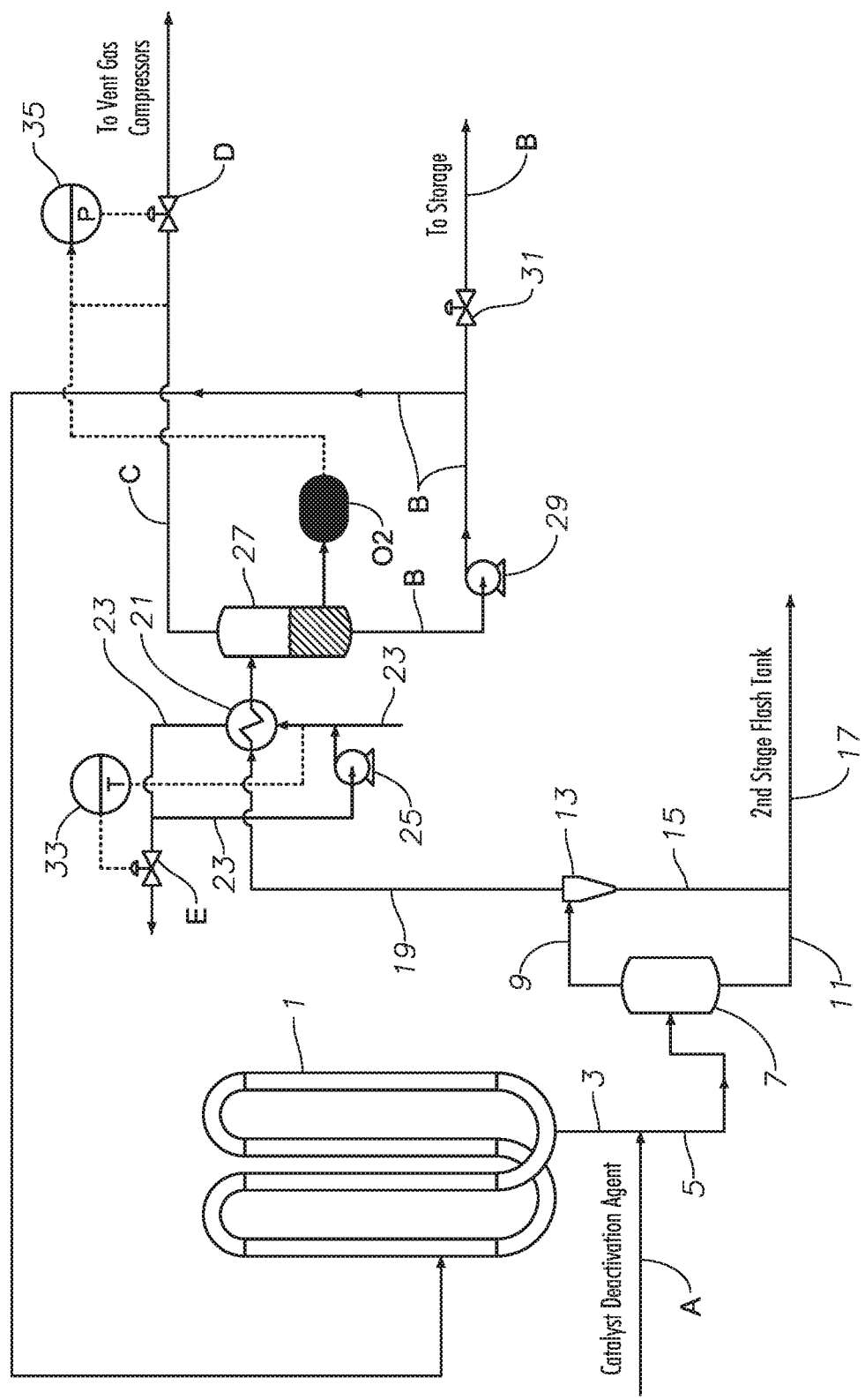
FIG. 3 illustrates a third embodiment of a system for implementing the disclosed method.

FIG. 3 illustrates yet another embodiment of the systems disclosed herein. In FIG. 3, a polymer product stream 3, as described above, is removed from a polymerization reactor 1. A stream of a catalyst inactivating agent A is combined with the polymer product stream, preferably at an inlet disposed in a transfer line conducting the polymer product stream, to form an inactivated product stream 5. The inactivated product stream is introduced into a $1^{st}$ stage flash tank 7, that operates at a temperature and pressure such that most, preferably almost all, of the diluent component of the inactivated product stream is vaporized, forming a top vapor stream 9 that comprises diluent and the catalyst inactivating agent, and also typically some unreacted monomer and other light components, and catalyst fines carried along. The top vapor stream is separated from a bottom stream 11, comprising the polymer product in a significantly denser reactor slurry.

The top vapor stream 9 is introduced into a cyclone 13 that separates a streams of solids 15, comprising mostly catalyst fines, from the vapor stream. The solids stream 15 is combined with the flash tank bottom stream 11 and the combined stream 17 is sent to a second stage flash tank and further downstream processing (not shown).

The cyclone also produces a second top vapor stream 19 that is introduced into a condenser 21. The temperature of the condenser is controlled by a flow of coolant 23 circulated by a pump 25, the volume of coolant flowing through the condenser being controlled by a temperature control valve.

The condenser is operatively connected to an accumulator drum 27 that separates the condenser products into a liquid product stream B comprising diluent and a vapor purge stream C comprising the catalyst inactivating agent. The liquid product B is then recycled to the polymerization reactor, providing recycled diluent, or sent to a storage facility, through pump 29 and in proportion according to the setting of the valve 31. (A system for optimizing control of use of recycled diluent is described in PCT Application No. PCT/US20/14806, filed Jan. 23, 2020, and hereby incorporated by reference, can be implemented together with the system disclosed herein.)

The purge stream C flows through a pressure control valve D before going on to a vent gas compression facility (not shown), and then is piped off-site for further processing.

A dissolved gas sensor O2 disposed in the accumulator tank measures the concentration of dissolved gaseous catalyst inactivating agent (typically oxygen, but can be carbon monoxide or carbon dioxide, or mixtures, as explained above) in the condensed liquid collected in the accumulator tank and signals to a pressure sensor-controller 35 operatively linked to the pressure control valve D (or alternatively can directly signal the pressure control valve D) that controls the overhead pressure in the condenser, the accumulator tank and in the purge gas line (as all of these compartments are connected to one another) in response to signaling from the dissolved gas sensor. The dissolved gas sensor O2 is configured to measure the concentration of dissolved catalyst inactivating agent in the condensed liquid collected in the accumulator tank and to signal to the pressure sensor-controller 35. The dissolved gas sensor is also configured to compare the dissolved oxygen concentration c to a predetermined/preselected set point $c_{sp}$ and to signal the pressure control valve D to open (thus lowering the overhead pressure in the accumulator tank, etc.) if the dissolved gaseous catalyst inactivating agent concentration is higher than the set point and to close (thus increasing the overhead pressure in the accumulator tank, etc.) if the dissolved gaseous catalyst inactivating agent concentration is below the set point. (The comparison function can be performed by a separate unit that stores to value of $c_{sp}$ and compares that value to the measured value c.) In the event that the dissolved gaseous catalyst inactivating agent concentration is equal to the set point (within an allowable variance), the dissolved gas sensor will not signal any movement of the pressure control valve D, or will signal the pressure control valve not to move, as might apply to the configuration of the system.

In such embodiments, the dissolved gas can be carbon monoxide, carbon dioxide, or any mixture of any two of oxygen, carbon monoxide and carbon dioxide, or a mixture of all three of them. Typically, the dissolved gas to be measured is oxygen. However the dissolved gas can be carbon monoxide, carbon dioxide, or a mixture of any two, or all three, of oxygen, carbon monoxide and carbon dioxide. Sensors for measuring concentrations of these gases in a liquid are considered known in the art.

A temperature control valve E can be operated separately from or together with the pressure control valve D to regulate the temperature of the condenser maintain an appropriate level of condensate in the accumulator tank. A temperature sensor-controller 33 measures the temperature of the coolant flow circulating through the condenser and regulates the flow of the coolant so as to maintain a temperature that provides a rate of condensation adequate to regulate the level of condensate in the accumulator tank.

Figure 4:
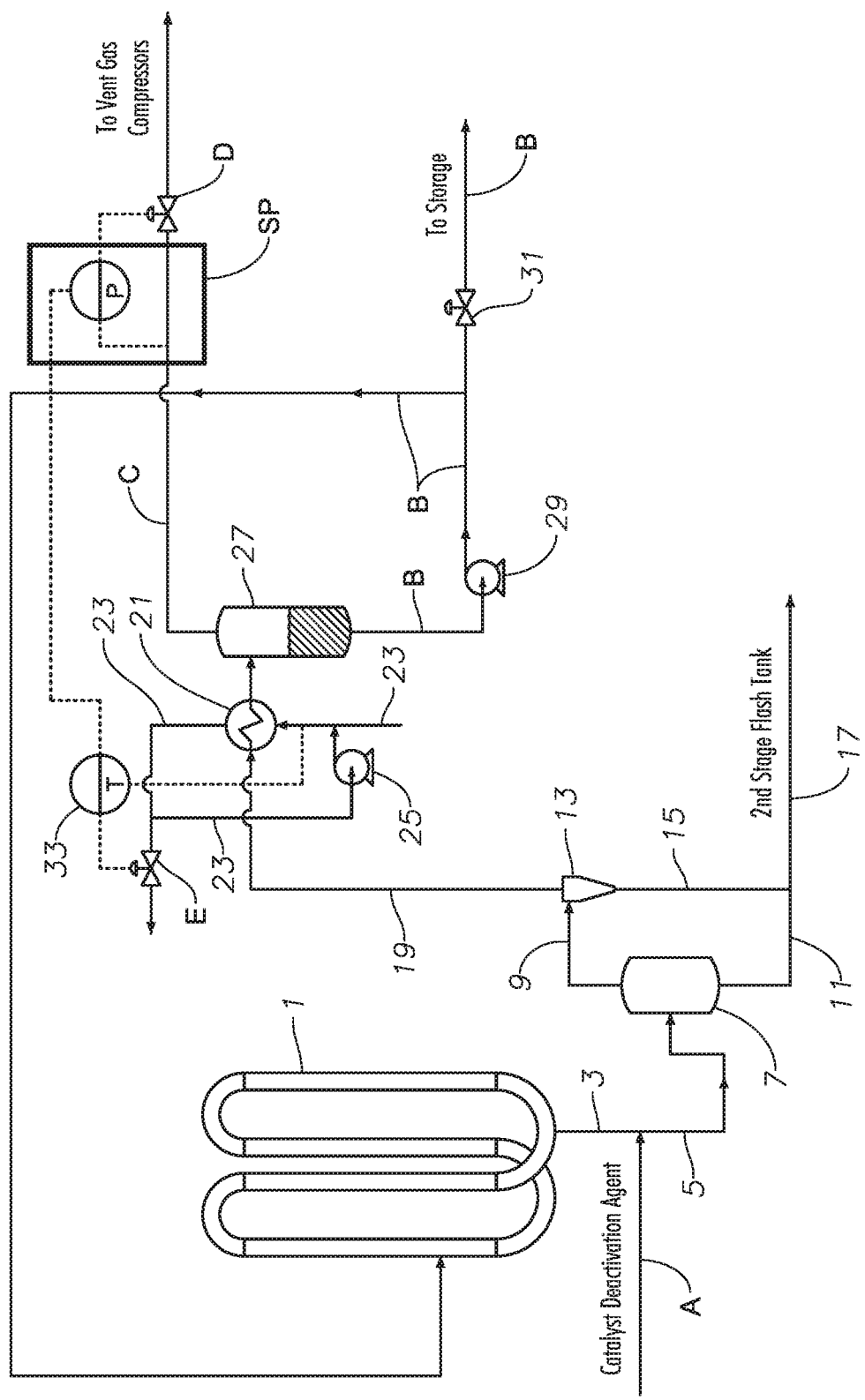
FIG. 4 illustrates another embodiment of a system for implementing the disclosed method.

FIG. 4 illustrates another embodiment of a system according to the present disclosure. In FIG. 4, a polymer product stream 3, as described above, is removed from a polymerization reactor 1. A stream of a catalyst inactivating agent A is combined with the polymer product stream, preferably at an inlet disposed in a transfer line conducting the polymer product stream, to form an inactivated product stream 5. The inactivated product stream is introduced into a $1^{st}$ stage flash tank 7, that operates at a temperature and pressure such that most, preferably almost all, of the diluent component of the inactivated product stream is vaporized, forming a top vapor stream 9 that comprises diluent and the catalyst inactivating agent, and also typically some unreacted monomer and other light components, and catalyst fines carried along. The top vapor stream is separated from a bottom stream 11, comprising the polymer product in a significantly denser reactor slurry.

The top vapor stream 9 is introduced into a cyclone 13 that separates a streams of solids 15, comprising mostly catalyst fines, from the vapor stream. The solids stream 15 is combined with the flash tank bottom stream 11 and the combined stream 17 is sent to a second stage flash tank and further downstream processing (not shown).

The cyclone also produces a second top vapor stream 19 that is introduced into a condenser 21. The temperature of the condenser is controlled by a flow of coolant 23 circulated by a pump 25 and the volume of coolant flow being controlled by a temperature control valve E that is in turn controlled by a temperature sensor-controller 33.

The condenser is operatively connected to an accumulator drum 27 that separates the condenser products into a liquid product stream B comprising diluent and a vapor purge stream C comprising the catalyst inactivating agent. The liquid product B is then recycled to the polymerization reactor, providing recycled diluent, or sent to a storage facility, through pump 29 and in proportion according to the setting of the valve 31. (A system for optimizing control of use of recycled diluent is described in PCT Application No. PCT/US20/14806, filed Jan. 23, 2020, and hereby incorporated by reference, can be implemented together with the system disclosed herein.)

The purge stream C flows through a pressure sensor-controller SP and a pressure control valve D before going on to a vent gas compression facility (not shown), and then piped off-site for further processing. The pressure sensor-controller is configured to signal to the temperature sensor-controller 33 to control the temperature control valve E (Alternatively, the pressure sensor-controller can be configured to directly control the temperature control valve E). The pressure sensor-controller is operatively connected to receive a signal from a pressure sensor disposed in the purge line, the purge line being in fluid connection with the accumulator tank so as to withdraw gas from the accumulator tank, and to store a desired pressure set point. The pressure in the purge line is measured by the pressure sensor-controller and the pressure sensor-controller is configured to control the temperature control valve in a manner that the temperature control valve is opened to lower the temperature of the condenser when the measured pressure is higher than the set point pressure and to close the temperature control valve to raise the temperature of the condenser when the measured pressure is lower than or equal to the set point, thereby regulating the temperature of the condenser such that a substantially constant vapor pressure of the overhead gas is maintained in the accumulator tank.

The pressure control valve can be operated independently of (or together with) the temperature control valve in the event that swings in the overhead pressure in the accumulator tank and downstream from it occur that are not quickly controlled by the change in condenser temperature.

Embodiments

Embodiment 1: A method for minimizing catalyst inactivating agent in a recycled diluent comprising:
 i. measuring the gas flow f through the purge line via a flow rate sensor that is operatively connected to send a signal to a flow controller, the purge line being in fluid connection with an accumulator tank that stores a condensate comprising the diluent under an overhead gas comprising a diluent so as to withdraw gas from the accumulator tank;
 ii. comparing the measured flow f to a desired gas flow rate set point $f_{sp}$ set in a flow controller operatively linked to a temperature control valve disposed in a coolant flow line that provides coolant to a heat exchanger in operative connection to a recycle condenser configured to contact a vapor received from a flash tank and condense at least a portion of the vapor to liquid; and
 iii. controlling the temperature control valve in a manner that the temperature control valve is opened to lower the temperature of the condenser when f is higher than $f_{sp}$ and the temperature control valve is closed to raise the temperature of the condenser if f is lower than $f_{sp}$, thereby regulating the temperature of the condenser such that a substantially constant vapor pressure p of the overhead gas is maintained in the accumulator tank.

Embodiment 2: The method of embodiment 1, further comprising:
 iv. measuring the pressure in the purge line p by a pressure sensor disposed in the purge line, and signaling the flow controller the pressure in the purge line; and
 v. controlling via the flow controller a pressure control valve in a manner that, if the pressure in the purge line exceeds a pre-set value of p, the pressure control valve is opened.

Embodiment 3: A method for minimizing catalyst inactivating agent in a recycled diluent comprising:
 i. measuring a pressure in a purge line p, the purge line being in fluid connection with an accumulator tank that stores a condensate comprising a diluent under an overhead gas comprising the diluent so as to withdraw gas from the accumulator tank;
 ii. comparing in a pressure controller that is operatively connected to receive a signal from the pressure sensor the measured pressure and a desired pressure set point $p_{sp}$ stored in the pressure controller; and
 iii. controlling a temperature control valve operatively linked to the pressure controller and disposed in a coolant flow line that provides coolant to a heat exchanger in operative connection to a recycle condenser configured to contact a vapor received from a flash tank and condense at least a portion of the vapor to liquid, in a manner that the temperature control valve is opened to lower the temperature of the condenser when p is higher than $p_{sp}$ and the temperature control valve is closed to raise the temperature of the condenser when p is lower than $p_{sp}$, thereby regulating the temperature of the condenser such that a substantially constant vapor pressure $p_{sp}$ of the overhead gas is maintained in the accumulator tank.

Embodiment 4: The method of Embodiment 3, that further comprises:
 iv. signaling a pressure controller the pressure in the purge line; and
 v. controlling via the pressure controller a pressure control valve in a manner that, if p exceeds the value of $p_{sp}$, the pressure control valve is opened.

Embodiment 5: A method for minimizing catalyst inactivating agent in a recycled diluent comprising:
 i. measuring the concentration of a gaseous catalyst inactivating agent c in a liquid condensate comprising a diluent and collecting under an overhead vapor comprising diluent and having a vapor pressure p;
 ii. comparing the measured concentration c to a pre-set set point $c_{sp}$ for concentration of a dissolved gaseous catalyst inactivating agent in the liquid condensate; and
 iii. purging a portion of the overhead vapor so as to lower the overhead vapor pressure p if the measured concentration of dissolved gaseous catalyst inactivating agent c is greater than $c_{sp}$.

Embodiment 6: The method of embodiment 5, wherein the purging is controlled by a pressure control valve that is configured to open when $c > c_{sp}$ and to close when $c < c_{sp}$.

Embodiment 7: The method of embodiment 5 or 6, that further comprises:
 iv. controlling a coolant flow to a heat exchanger inoperative connection to a condenser configured to condense a vapor and condense at least a portion of the vapor to liquid, in a manner that the coolant flow is decreased to raise the temperature of the condenser when $c > c_{sp}$ and controlling the coolant flow in a manner that the coolant flow is increased to lower the temperature of the condenser when $c < c_{sp}$.

Embodiment 8: A method for minimizing catalyst inactivating agent in a recycled diluent comprising:

i. measuring the concentration c of a gaseous catalyst inactivating agent dissolved in a liquid condensate comprising a diluent and collecting under an overhead vapor comprising the diluent and having a vapor pressure p;

ii. comparing the measured concentration c to a pre-set set point $c_{sp}$ for concentration of a dissolved gaseous catalyst inactivating agent in the liquid condensate; and iii. controlling a temperature control valve disposed in a coolant flow line that provides coolant to a heat exchanger in operative connection to a recycle condenser configured to contact a vapor received from a flash tank and condense at least a portion of the vapor to liquid, in a manner that the temperature control valve is closed to raise the temperature of the condenser when $c>c_{sp}$ and the temperature control valve is opened to lower the temperature of the condenser when $c<c_{sp}$.

Embodiment 9: The method of embodiment 8, further comprising:

iv. measuring the pressure in the purge line p by a pressure sensor disposed in the purge line, and signaling a flow controller the pressure in the purge line; and v. controlling via the flow controller a pressure control valve in a manner that, if the pressure in the purge line exceeds a pre-set value of p, the pressure control valve is opened.

Embodiment 10: The method of any one of embodiments 1 through 9, in which the catalyst inactivating agent is oxygen, carbon monoxide, carbon dioxide, or a mixture of any two of or of all three of oxygen, carbon monoxide and carbon dioxide.

Embodiment 11: An apparatus for regulating the pressure of overhead gas in a vessel accumulating a recycled diluent, comprising:
  i) a polymerization reactor system including:
    i-1) a polymerization reactor configured for performing a polymerization reaction in a slurry;
    i-2) a slurry separation system configured for separating polymer product from diluent in the slurry and recovering polymer product separately from diluent;
    i-3) a diluent recycling facility that includes a recycle accumulator configured to collect a condensate liquid under an overhead gas and includes a purge line being in fluid connection with the recycle accumulator so as to withdraw overhead gas from the recycle accumulator;
  ii) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator, and configured to receive a signal from a flow controller; and
  iii) a flow controller that is configured to receive a signal from a flow rate sensor disposed in the purge line, the flow controller being configured to measure in operation the gas flow through the purge line f via the flow rate sensor, to store a pre-set gas flow set point $f_{sp}$ and to compare the gas flow to the stored gas flow rate set point, and configured to send a signal to the temperature control valve in a manner that in operation the temperature control valve is opened when f is higher than $f_{sp}$ and the temperature control valve is closed when f is lower than $f_{sp}$, thereby regulating the temperature of the condenser such that a substantially constant vapor pressure of the overhead gas is maintained in the accumulator tank.

Embodiment 12: The apparatus of embodiment 11, that further comprises:
  iv) a pressure control valve disposed in the purge line; and
  v) a pressure sensor-controller disposed in the purge line; wherein the pressure sensor-controller is configured to measure the pressure in the purge line p and is configured to store a set point value $p_{sp}$ of vapor pressure in the purge line and, if in operation p exceeds $p_{sp}$ to send a signal to the flow controller, and the flow controller is configured so that, if said signal is received from the pressure sensor-controller, the pressure control valve is opened.

Embodiment 13: An apparatus for regulating the pressure of overhead gas in a vessel accumulating a recycled diluent, comprising:
  i) a polymerization reactor system including:
    i-1) a polymerization reactor configured for performing a polymerization reaction in a slurry;
    i-2) a slurry separation system configured for separating polymer product from diluent in the slurry and recovering polymer product separately from diluent;
    i-3) a diluent recycling facility that includes a recycle accumulator configured to collect a condensate liquid comprising the diluent under an overhead vapor comprising the diluent and includes a purge line being in fluid connection with the recycle accumulator so as to withdraw overhead vapor from the recycle accumulator;
  ii) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator; and
  iii) a sensor of dissolved gas concentration, the gas being oxygen, carbon monoxide or carbon dioxide, or any mixture thereof, disposed in the recycle accumulator and configured in operation to store a set point of dissolved gas concentration in condensed diluent collected in the accumulator, to measure the concentration of dissolved gas in collected condensate, and configured to send a signal to the temperature control valve in a manner that in operation the temperature control valve is closed when the dissolved gas concentration is higher than the set point and the temperature control valve is opened when the dissolved gas concentration is lower than the set point, thereby regulating the temperature of the condenser such that a substantially constant vapor pressure of the overhead gas is maintained in the accumulator tank.

Embodiment 14: An apparatus for regulating the pressure of overhead gas in a vessel accumulating a recycled diluent, comprising:
  i) a polymerization reactor system including:
    i-1) a polymerization reactor configured for performing a polymerization reaction in a slurry;
    i-2) a slurry separation system configured for separating polymer product from diluent in the slurry and recovering polymer product separately from diluent;
    i-3) a diluent recycling facility that includes a recycle accumulator configured to collect a condensate liquid comprising the diluent under an overhead vapor comprising the diluent and includes a purge line being in fluid connection with the recycle accumulator so as to withdraw overhead vapor from the recycle accumulator;
ii) a dissolved gas sensor, the gas being oxygen, carbon monoxide or carbon dioxide, or any mixture thereof, disposed in the recycle accumulator and configured to measure the concentration of dissolved gas in condensate collected in operation;
iii) a pressure control valve disposed in the purge line and configured to receive a signal from a pressure controller; and
iv) a pressure controller that is configured to in operation store a set point of dissolved oxygen concentration in the collected condensate $c_{sp}$, to compare the set point to the measured dissolved gas concentration in the collected condensate c, and to signal the pressure control valve to open when c is greater than $c_{sp}$ and to signal the pressure control valve to close when c is less than $c_{sp}$, such that a substantially constant vapor pressure of the overhead gas is maintained in the accumulator tank.

Embodiment 15: The apparatus of claim 17, further comprising:
v) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the accumulator, and configured to receive a signal from a flow controller; and
vi) a flow controller that is configured to receive a signal from a flow rate sensor disposed in the purge line, the flow controller being configured to measure in operation the gas flow through the purge line f via the flow rate sensor, to store a pre-set gas flow rate set point $f_{sp}$ and to compare the purge line gas flow to the pre-set gas flow rate set point, and configured to send a signal to the temperature control valve in a manner that in operation the temperature control valve is opened when f is higher than $f_{sp}$ and the temperature control valve is closed when f is lower than $f_{sp}$.

EXAMPLE

A system as disclosed herein and a method for minimizing the amount of catalyst inactivating agent in diluent recycled through the system is illustrated by the working example described below. The scope of the invention is not limited to the working example described, and is defined by the claims recited below.

Figure 5:
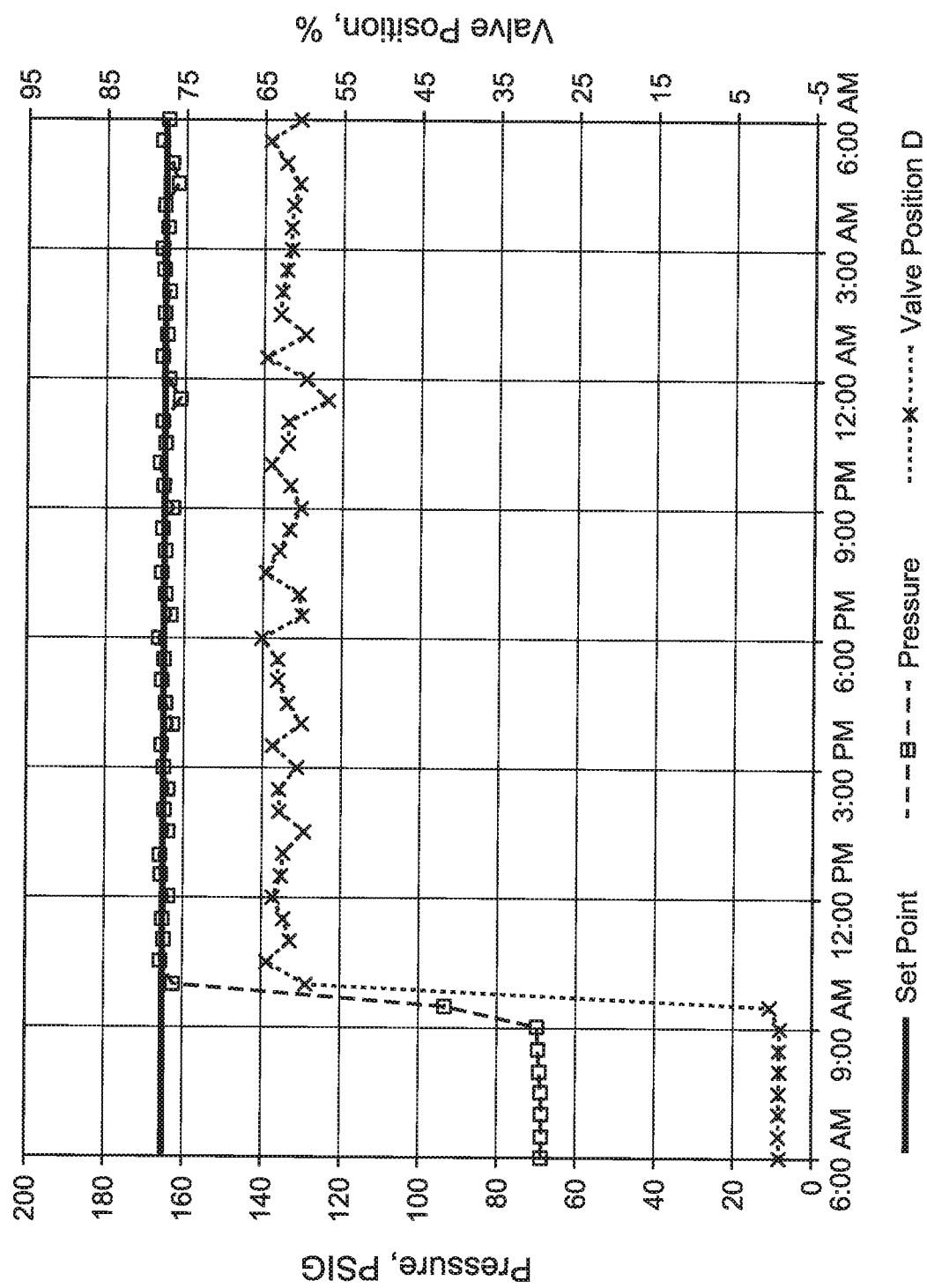
FIG. 5 is a graph of accumulator overhead pressure, accumulator overhead pressure set point stored in the purge gas line flow controller (controller F in FIG. 1) and purge line pressure control valve position (valve D in FIG. 1) versus time during operation of an embodiment of the disclosed control system.
Figure 6:
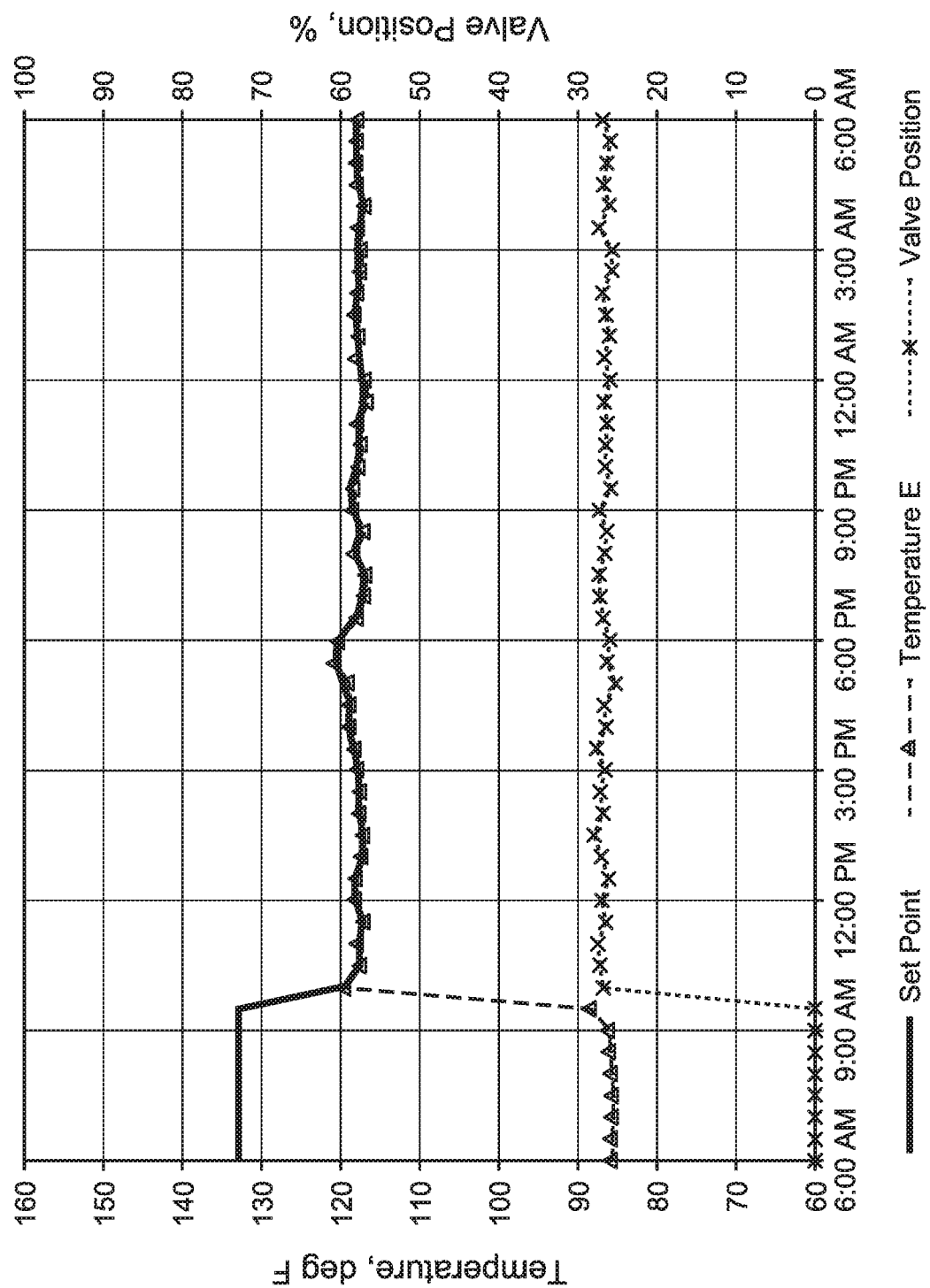
FIG. 6 is a graph of condenser temperature, condenser temperature set in the purge gas line flow controller (controller F in FIG. 1) and condenser coolant flow control valve position (valve E in FIG. 1) versus time during operation of an embodiment of the disclosed control system.
Figure 7:
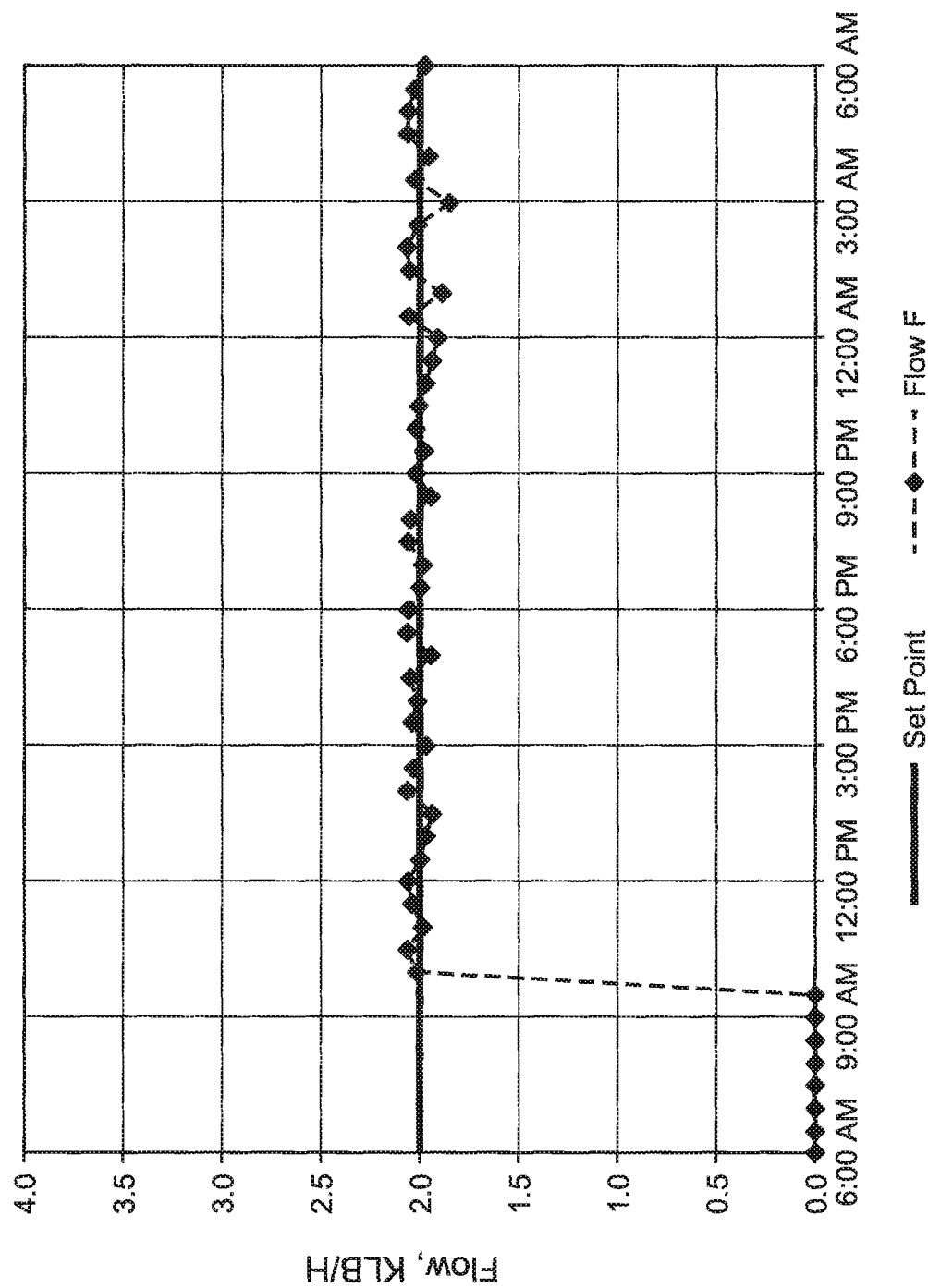
FIG. 7 is a graph of purge gas flow rate through the purge gas line measured by the flow controller (flow controller F in FIG. 1) versus time during operation of an embodiment of the disclosed control system.

A slurry-loop polymerization reactor having a two-stage diluent recovery system, as illustrated in FIG. 1, is in normal operation when a 1st stage accumulator overhead pressure regulator system is placed into service (time 0=6:00 AM). Accumulator pressure, as regulated by valve D in FIG. 1, starts to increase at approximately 9:30 AM, approximately 1 hour later reaching the setpoint pressure of 165 psig set in the flow controller F. Accumulator pressure is then regulated at the 165 psig setpoint by adjusting valve position D, see FIG. 5. Concurrently, purge gas flow controller F begins adjusting the setpoint of condenser temperature controller E to regulate the condensing fraction of the flash gas stream 19 in FIG. 1. Controller E temperature setpoint is lowered from an initial value of approximately 133° F. to a range of 116-120° F. Purge gas flow controller F achieves a stable rate of 2.0 KLB/H at approximately 10:00 AM by adjusting the condenser temperature setpoint, and the purge gas flow is controlled at that stable rate thereafter. See FIGS. 6 and 7.

What is claimed is:
1. A method for minimizing catalyst inactivating agent in a recycled diluent comprising:
  i. measuring either or both of (a) gas flow f and/or (b) pressure p in a purge line in fluid connection with an accumulator tank that stores a condensate comprising the diluent under an overhead gas comprising a diluent so as to withdraw gas from the accumulator tank; wherein
    i(a). the gas flow f, if measured, is measured via a flow rate sensor that is operatively connected to send a gas flow signal to a flow controller operatively linked to a temperature control valve disposed in a coolant flow line that provides coolant to a heat exchanger in operative connection to a recycle condenser configured to contact a vapor received from a flash tank and condense at least a portion of the vapor to liquid; and/or
    i(b). the pressure p, if measured, is measured via a pressure sensor that is operatively connected to send a pressure signal indicating the measured pressure p to a pressure controller;
  ii. either or both of (a) comparing the measured flow f to a desired gas flow rate set point $f_{sp}$ set in the flow controller and/or (b) comparing the measured pressure p to a desired pressure set point $p_{sp}$ in the pressure controller; and
  iii. regulating the temperature of the condenser such that a substantially constant vapor pressure of the overhead gas is maintained in the accumulator tank, by either or both of:
    iii(a). controlling the temperature control valve via the flow controller such that the temperature control valve is opened to lower the temperature of the condenser when f is higher than $f_{sp}$, and the temperature control valve is closed to raise the temperature of the condenser when f is lower than $f_{sp}$; and/or
    iii(b). controlling the temperature control valve via the pressure controller such that the temperature control valve is opened to lower the temperature of the condenser when p is higher than $p_{sp}$, and the temperature control valve is closed to raise the temperature of the condenser when p is lower than $p_{sp}$.

2. The method of claim 1, wherein the pressure sensor is further operatively connected to send the pressure signal indicating p to the flow controller; and wherein the method further comprises controlling, via the flow controller, a pressure control valve in a manner that, if the measured pressure p exceeds $p_{sp}$, the pressure control valve is opened.

3. The method of claim 1, further comprising controlling via the pressure controller a pressure control valve in a manner that, if p exceeds the value of $p_{sp}$, the pressure control valve is opened.

4. A method for minimizing catalyst inactivating agent in a recycled diluent comprising:
  i. measuring the concentration c of a gaseous catalyst inactivating agent c in a liquid condensate comprising a diluent and collecting under an overhead vapor comprising the diluent and having a vapor pressure;
  ii. comparing the measured concentration c to a pre-set set point $c_{sp}$ for concentration of dissolved gaseous catalyst inactivating agent in the liquid condensate; and
  iii. either or both of iii(a) or iii(b):
    iii(a). purging a portion of the overhead vapor so as to lower the overhead vapor pressure if the measured concentration of dissolved gaseous catalyst inactivating agent c is greater than $c_{sp}$;

iii(b). controlling a temperature control valve disposed in a coolant flow line that provides coolant to a heat exchanger in operative connection to a recycle condenser configured to contact a vapor received from a flash tank and condense at least a portion of the vapor to liquid, in a manner that the temperature control valve is closed to raise the temperature of the condenser when $c > c_{sp}$ and the temperature control valve is opened to lower the temperature of the condenser when $c < c_{sp}$.

5. The method of claim 4, wherein the method comprises the iii(a) purging, and the purging is controlled by a pressure control valve that is configured to open when $c > c_{sp}$ and to close when $c < c_{sp}$.

6. The method of claim 4, that comprises both iii(a) and iii(b), and further wherein the closing the temperature control valve to raise the temperature of the condenser causes coolant flow to the condenser to decrease; and opening the temperature control valve to lower the temperature of the condenser causes coolant flow to the condenser to increase.

7. The method of claim 4, further comprising:
   iv. measuring the pressure in the purge line p by a pressure sensor disposed in the purge line, and signaling a flow controller the pressure in the purge line; and
   v. controlling via the flow controller a pressure control valve in a manner that, if the pressure in the purge line exceeds a pre-set value of p, the pressure control valve is opened.

8. The method of claim 1, in which the catalyst inactivating agent is oxygen, carbon monoxide, carbon dioxide, or a mixture of any two of or of all three of oxygen, carbon monoxide and carbon dioxide.

9. The method of claim 4, in which the gaseous catalyst inactivating agent is oxygen, carbon monoxide, carbon dioxide, or a mixture of any two of or of all three of oxygen, carbon monoxide and carbon dioxide.

10. An apparatus for regulating the pressure of overhead gas in a vessel accumulating a recycled diluent, comprising:
   i) a polymerization reactor system including:
      i-1) a polymerization reactor configured for performing a polymerization reaction in a slurry;
      i-2) a slurry separation system configured for separating polymer product from diluent in the slurry and recovering polymer product separately from diluent;
      i-3) a diluent recycling facility that includes a recycle accumulator configured to collect a condensate liquid under an overhead gas and includes a purge line being in fluid connection with the recycle accumulator so as to withdraw overhead gas from the recycle accumulator;
   ii) a temperature control valve disposed in a coolant flow line that provides coolant to a heat exchanger in operative connection to a recycle condenser configured to contact a vapor received from the slurry separation system and condense at least a portion of the vapor to liquid and to convey the vapor and liquid to the recycle accumulator, and configured to receive a signal from a flow controller; and
   iii) either or both of the following configured to maintain a substantially constant vapor pressure of the overhead gas in the recycle accumulator:
      iii(a) a flow controller that is (1) configured to receive a signal from a flow rate sensor disposed in the purge line, the flow controller being configured to measure in operation the gas flow f through the purge line via the flow rate sensor, to store a pre-set gas flow set point $f_{sp}$ and to compare the gas flow to the stored gas flow rate set point, and that is (2) further configured to send a signal to the temperature control valve in a manner that in operation the temperature control valve is opened when f is higher than $f_{sp}$ and the temperature control valve is closed when f is lower than $f_{sp}$, thereby regulating the temperature of the condenser such that said substantially constant vapor pressure of the overhead gas is maintained in the recycle accumulator; and
      iii(b) a sensor of dissolved gas concentration, the gas being oxygen, carbon monoxide or carbon dioxide, or any mixture thereof, disposed in the recycle accumulator and configured in operation to store a set point of dissolved gas concentration in condensed diluent collected in the recycle accumulator, to measure the concentration of dissolved gas in collected condensate, and configured to send a signal to the temperature control valve in a manner that in operation the temperature control valve is closed when the dissolved gas concentration is higher than the set point and the temperature control valve is opened when the dissolved gas concentration is lower than the set point, thereby regulating the temperature of the condenser such that said substantially constant vapor pressure of the overhead gas is maintained in the recycle accumulator.

11. The apparatus of claim 10, that further comprises:
   iv) a pressure control valve disposed in the purge line; and
   v) a pressure sensor-controller disposed in the purge line;
   wherein the pressure sensor-controller is configured to measure the pressure in the purge line p and is configured to store a set point value $p_{sp}$ of vapor pressure in the purge line and, if in operation p exceeds $p_{sp}$ to send a signal to the flow controller, and the flow controller is configured so that, if said signal is received from the pressure sensor-controller, the pressure control valve is opened.

12. The apparatus of claim 10, comprising both the flow controller iii(a) and the sensor iii(b).

\* \* \* \* \*